(12) United States Patent
Nguyen

(10) Patent No.: US 8,332,672 B2
(45) Date of Patent: *Dec. 11, 2012

(54) OPTIMIZED COMPENSATION IN A VOLTAGE REGULATOR

(75) Inventor: Don J. Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 391 days.

This patent is subject to a terminal disclaimer.

(21) Appl. No.: 12/623,275

(22) Filed: Nov. 20, 2009

(65) Prior Publication Data

US 2010/0070788 A1    Mar. 18, 2010

Related U.S. Application Data

(63) Continuation of application No. 11/396,093, filed on Mar. 31, 2006, now Pat. No. 7,624,291.

(51) Int. Cl.
*G06F 1/32* (2006.01)

(52) U.S. Cl. .......................... 713/320; 713/323

(58) Field of Classification Search ................. 713/320, 713/323
See application file for complete search history.

(56) References Cited

U.S. PATENT DOCUMENTS

| | | | |
|---|---|---|---|
| 5,731,731 | A | 3/1998 | Wilcox et al. |
| 5,864,225 | A | 1/1999 | Bryson |
| 6,525,599 | B2 | 2/2003 | Nguyen et al. |
| 6,675,304 | B1 | 1/2004 | Pole et al. |
| 6,681,335 | B1 | 1/2004 | Rice et al. |
| 6,785,829 | B1 | 8/2004 | George et al. |
| 6,839,854 | B2 | 1/2005 | Nguyen |
| 7,100,061 | B2 | 8/2006 | Halepete et al. |
| 7,260,731 | B1 | 8/2007 | Read et al. |
| 7,376,854 | B2 | 5/2008 | Lehwalder et al. |
| 7,624,291 | B2 * | 11/2009 | Nguyen .................. 713/320 |
| 2006/0082353 | A1 | 4/2006 | Solivan et al. |
| 2006/0184812 | A1 | 8/2006 | Nguyen et al. |

* cited by examiner

*Primary Examiner* — Chun Cao
(74) *Attorney, Agent, or Firm* — Jordan IP Law, PC

(57) ABSTRACT

Multiple components of a computer system may be capable of entering wake and sleep states. The power consumption of a processor during wake state may draw significant amount of current. In order to keep power consumption of a voltage regulator low, a two-phase voltage regulator may be used during wake state. During sleep state, since power consumption is lower, the two-phase voltage regulator may be operated in a single-phase mode to further reduce voltage regulator power consumption.

17 Claims, 5 Drawing Sheets

OPTIMIZED COMPENSATION IN A VOLTAGE REGULATOR

CROSS REFERENCE TO RELATED APPLICATIONS

This application is a Continuation of application Ser. No. 11/396,093, filed on Mar. 31, 2006, now U.S. Pat. No. 7,624,291.

BACKGROUND INFORMATION

Computer systems are becoming increasing pervasive in our society, including everything from small handheld electronic devices, such as personal data assistants and cellular phones, to application-specific electronic devices, such as set-top boxes, digital cameras, and other consumer electronics, to medium-sized mobile systems such as notebook, sub-notebook, and tablet computers, to desktop systems, servers and workstations. Computer systems typically include one or more processors. A processor manipulates and controls the flow of data in a computer by executing instructions.

To provide more powerful computer systems for consumers, processor designers strive to continually increase the operating speed of the processor. Unfortunately, as processor speed increases, the power consumed by the processor tends to increase as well. Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

One method of reducing the amount of electric power drawn by a computer system is to design the system such that it is capable of operating in two different modes. In a first mode of operation, only the most vital functions of the system, such as those dedicated to monitoring for user input, are active. This may be referred to as a "sleep mode." During the sleep mode, the computer system draws very little power from the voltage regulator (alternatively referred to as the power/voltage/Vcc supply or power/voltage/Vcc source). In a second mode of operation, the computer system is busy executing instructions to accomplish a particular task. This is referred to as the "wake mode." During the wake mode, the computer system consumes a significant amount of power from the power supply.

Unfortunately, there is a side effect associated with switching a computer system between sleep and wake modes. The rapid change in current drawn from the power supply when the computer switches between modes causes fluctuations in the voltage supplied to the computer by the voltage regulator. Going from a wake mode to a sleep mode may cause a rapid decrease in current, resulting in an upwardly spiking voltage transient. Similarly, going from a sleep mode to a wake mode may cause a rapid increase in current, resulting in a downwardly spiking voltage transient.

The present invention addresses this and other issues associated with the prior art.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

Figure 1:
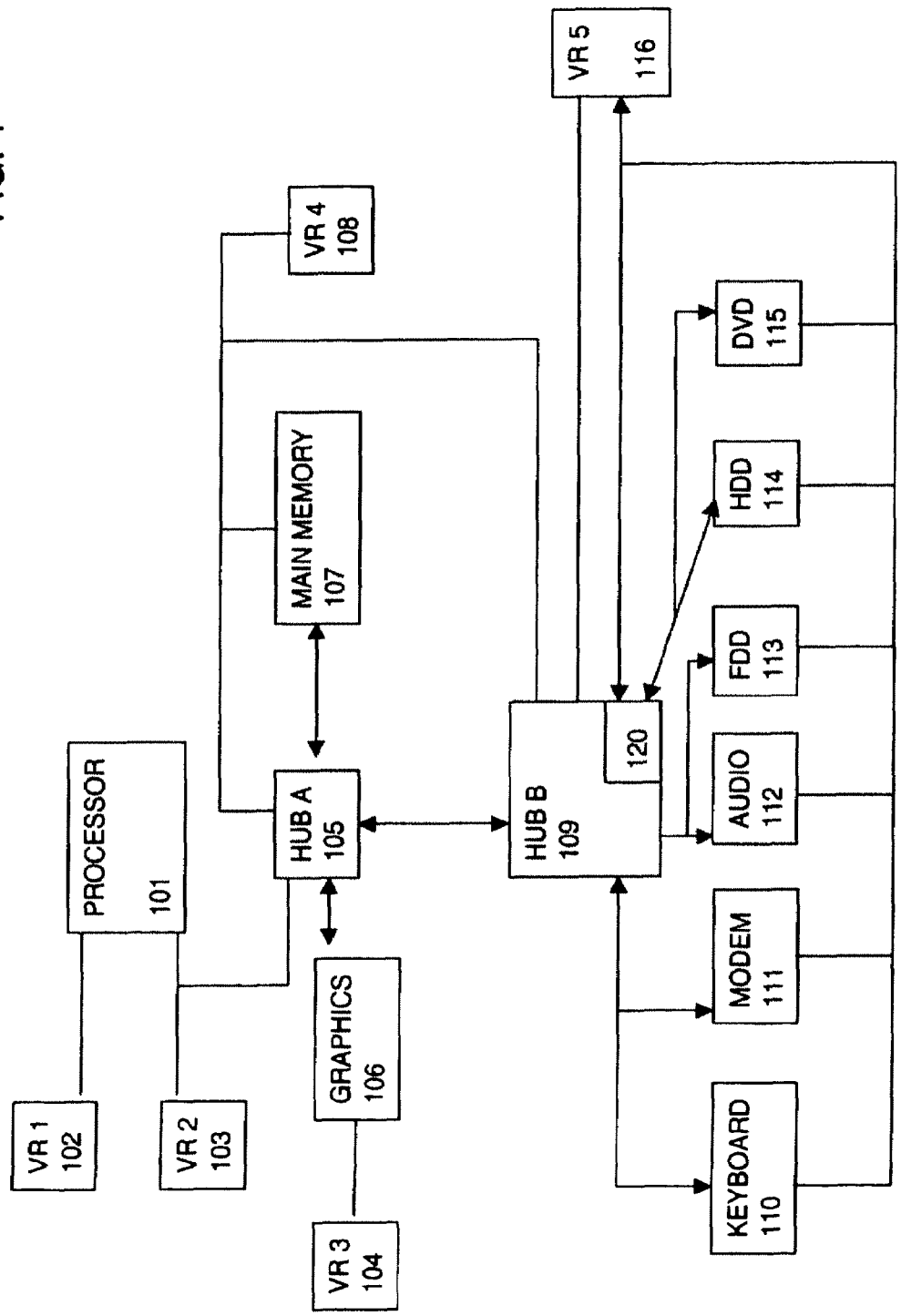
FIG. 1 illustrates a block diagram of a computer system in accordance with an embodiment.

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

In accordance with an embodiment of the present invention, a voltage regulator supplies power (alternatively referred to as a voltage level or Vcc level) to multiple devices within a computer system. The voltage level from the voltage regulator may be maintained at a first voltage level that is below the nominal voltage level of the regulator while the devices are in a wake state. In doing so, less power is consumed by the computer system because power consumption is proportional to the square of the voltage level. The voltage level from the voltage regulator may then be increased to a second voltage level when the devices switch to a sleep state. The output of the voltage regulator may be set to an intermediate voltage level, between the first and second voltage levels, when some of the devices are in a wake state and some of the devices are in a sleep state.

Wake and sleep states of the devices are indicated by a power state status signal provided to the voltage regulator. The associated output voltage levels from the voltage regulator are predetermined to be values that will maintain the voltage levels within an appropriate tolerance range despite voltage transients. These voltage transients are the expected result of current fluctuations associated with transitions between wake and sleep states of the devices. A more detailed description of embodiments of the present invention, including various configurations and implementations, is provided below.

As used herein, the terms "wake" and "sleep" are relative indications of the power state of a device. A device in a wake state may generally consume more power, on average, than the same device in a sleep state. In accordance with one embodiment of the present invention, a device in a wake state is either in an operational state or is ready for operation (i.e. receiving, transmitting, or accessing data or ready to receive, transmit, or access data). A device in a sleep state is in a non-operational state. For example, a hard drive, floppy drive, or DVD may be considered to be in a wake state while its storage medium is spinning and in a sleep state while its storage medium is not spinning (or is spinning at a speed that is less than a predetermined speed).

For one embodiment of the present invention, the terms "wake" and "sleep" may be interpreted in accordance with the ACPI specification (Advanced Configuration and Power Interface Specification, Rev. 2.0, published Jul. 27, 2000, by Compaq, Intel, Microsoft, Phoenix, and Toshiba), but is not to be so limited. Note that what is referred to herein as a sleep state may alternatively be referred to as an inactive, power-down, deep power-down, deep sleep, low-power, or idle state.

In accordance with one embodiment of the present invention, the power state status signal provided to the voltage regulator to indicate wake and sleep states of the devices in the computer system may be a signal defined by the ACPI specification. For example, the power state status signal may be the SLP_S3# signal, as described in the ACPI specification. Alternatively, the power state status signal may be any signal generated by any controller within the computer system to indicate the power state of individual or multiple devices within the system. This controller may reside centrally within a hub or bridge (often contained in a chipset) of a computer system (as described in more detail below), or, alternatively, it may reside centrally within another device of the computer system, or as a discrete component. In accordance with an alternate embodiment, it may be distributed across multiple devices or discrete components of the computer system. For example, each device coupled to a voltage regulator may send its own power state status signal separately to the voltage regulator to indicate its power state.

It is to be noted that the power state status signal proved to the voltage regulator may indicate a power state change of an associated device (or of multiple devices) before, after, or during the power state transition of the device. As used herein, the term "when" is used to indicate the temporal nature of any of these power state transitions. For example, the phrase "a signal is sent to the voltage regulator when the device enters the sleep state" is to be interpreted to mean that the signal may be sent before, after, or during the transition into the sleep state, but is nonetheless associated with that transition into the sleep state.

In accordance with one embodiment of the present invention, The voltage regulator provides a supply voltage to the processor and may be in accordance with a version of the Intel Mobile Voltage Positioning (MVP) specification such as the IMVP-6 specification, for example.

FIG. 1 includes a computer system formed in accordance with an embodiment of the present invention. Processor 101 is coupled to Hub A 105 to communicate with memory 107, graphics device 106, and Hub B. Hub B is, in turn, coupled to several peripheral input/output devices, including, for example, keyboard 110, modem 111, audio device 112, floppy disk drive 113, hard disk drive 114, and DVD 115. The computer system of FIG. 1 additionally includes multiple voltage regulators (VRs) to supply power at different voltage levels to the various components of the system. For example, VR1 102 supplies power to processor 101. VR2 103 supplies power to both processor 101 and to Hub A 105. VR3 104 supplies power to graphics device 106. VR4 105 supplies power to Hub A 105, memory 107, and to Hub B 109. VR5 116 also supplies power to Hub B 109 as well as to keyboard 110, modem 111, audio device 112, floppy disk drive 113, hard disk drive 114, and DVD 115. Hub B 109 may include power manager 120.

Note that some voltage regulators supply power to a single component while other voltage regulators supply power to multiple components. In addition, some components receive a voltage supply from only a single voltage regulator while other components receive multiple voltage supplies from multiple voltage regulators. It is to be appreciated that in accordance with alternate embodiments of the present invention, alternate couplings of voltage regulators to these and other components of a computer system may be implemented.

Multiple components of the computer system of FIG. 1 may be capable of entering wake and sleep states. For example, as described above, hard disk drive 114 and DVD 115 may be considered to be in a sleep state when their respective storage mediums are not spinning. Other components, such as processor 101, may have various wake and sleep states. For example, processor 101 may have a fully operational wake state, a partially operational wake state, a partial sleep state, a regular sleep state, a deeper sleep state, etc. These different levels of wake and sleep states may have various current consumption levels associated with them.

The power state signal may be a signal generated by any power manager within the computer system to indicate the power state of individuals or multiple components within the system. This power manager may reside centrally within a hub or bridge (often contained in a chipset) of a computer system, or, alternatively, it may reside centrally within another component. In accordance with an alternate embodiment, it may be distributed across multiple components of the computer system. For example, each component coupled to a voltage regulator may send it own power state signal separately to the voltage regulator to indicate its power state.

In accordance with one embodiment, the power state signal provided to the voltage regulator to indicate wake or sleep state of the components may be a signal associated with the ACPI specification. For example, the power state signal may indicate an ACPI S3 state, as described in the ACPI specification.

In accordance with an embodiment of the present invention, the power consumption of a processor during a wake state may draw a significant amount of current. To keep the power consumption of the voltage regulator low, a two-phase voltage regulator may be used in the wake state. However, once awake, the processor goes to sleep state very quickly. By enabling the system to go from wake to sleep state quickly, is how the power consumption average of the processor is kept low. During the sleep state, since the processor power consumption is lower, the two-phase voltage regulator is typically operated in a single-phase mode to further reduce the voltage regulator power consumption. In addition, it is done to reduce overall platform power consumption.

In accordance with an embodiment of the present invention the voltage regulator provides a supply voltage to the processor and may be in accordance with a version of the Intel Mobile Voltage Positioning (IMVP) specification such as the IMVP-6 specification, for example.

Figure 2:
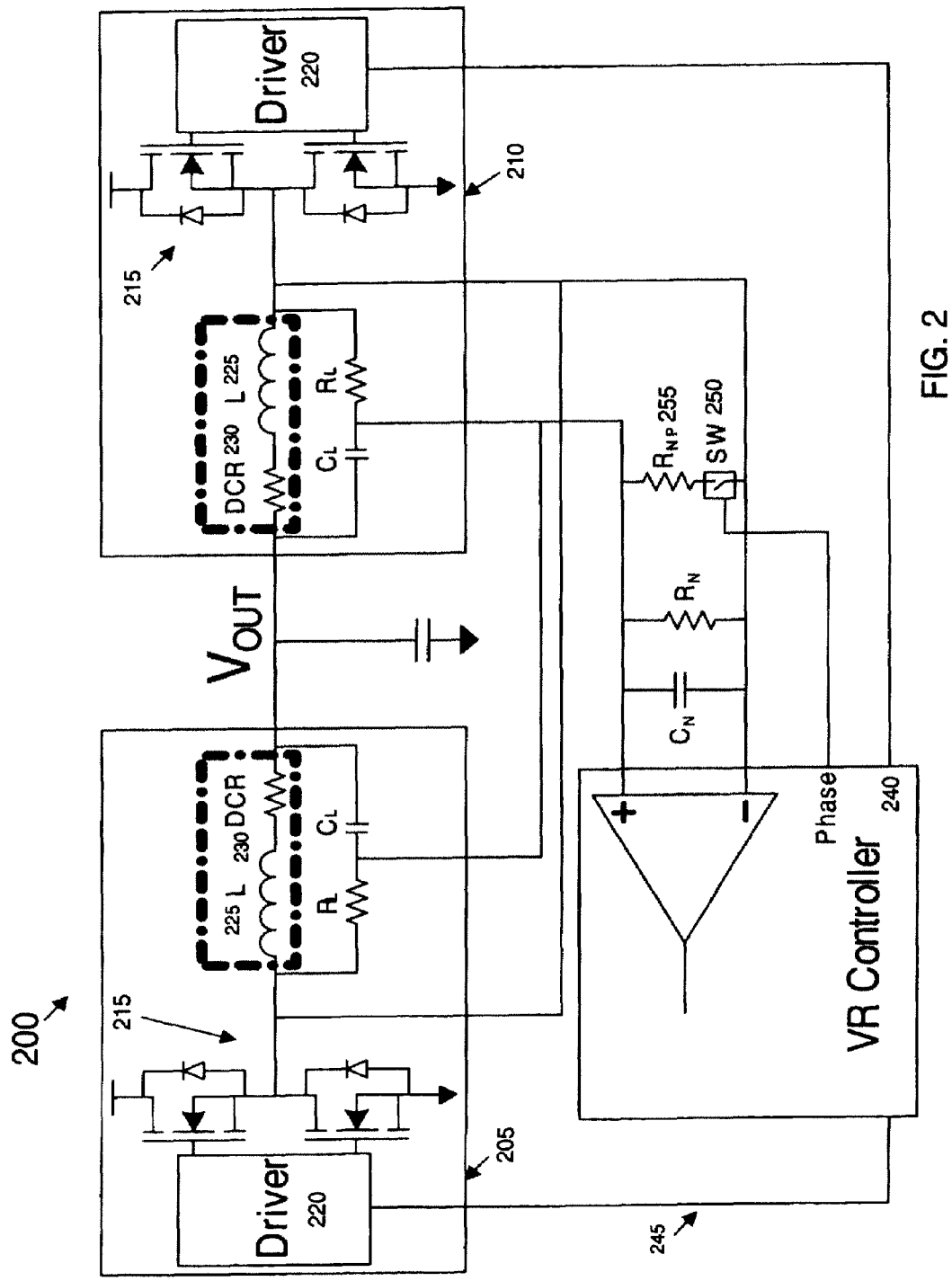
FIG. 2 illustrates a circuit schematic of an optimized multi-phase voltage regulator in accordance to one embodiment.

FIG. 2 illustrates a circuit schematic of a multi-phase voltage regulator. In particular, the embodiment shown in FIG. 2 is a two-phase voltage regulator 200 having two power circuits 205, 210. In this embodiment, each power circuit 205, 210 has a pair of N channel metal oxide semiconductor field effect transistors (MOSFETs) 215 which are controlled by a driver 220 to activate and deactivate an inductive element. This inductive element 225 may be inductor L. The inductor 225 is in series with a resistor 230, such as resistor DCR (DC Resistance). Resistor DCR 230 may be the DC resistance of the inductor L 225 or a discrete resistor.

In order to measure the current flowing through the inductor L 225, the system measures the voltage across DCR 230 with $R_L$ and $C_L$. The current or voltage drop across the resistor 230 is computed and measured. Once computed, the system now knows the amount of current being output to the CPU. This information is then used to set the output voltage accordingly.

Figure 3:
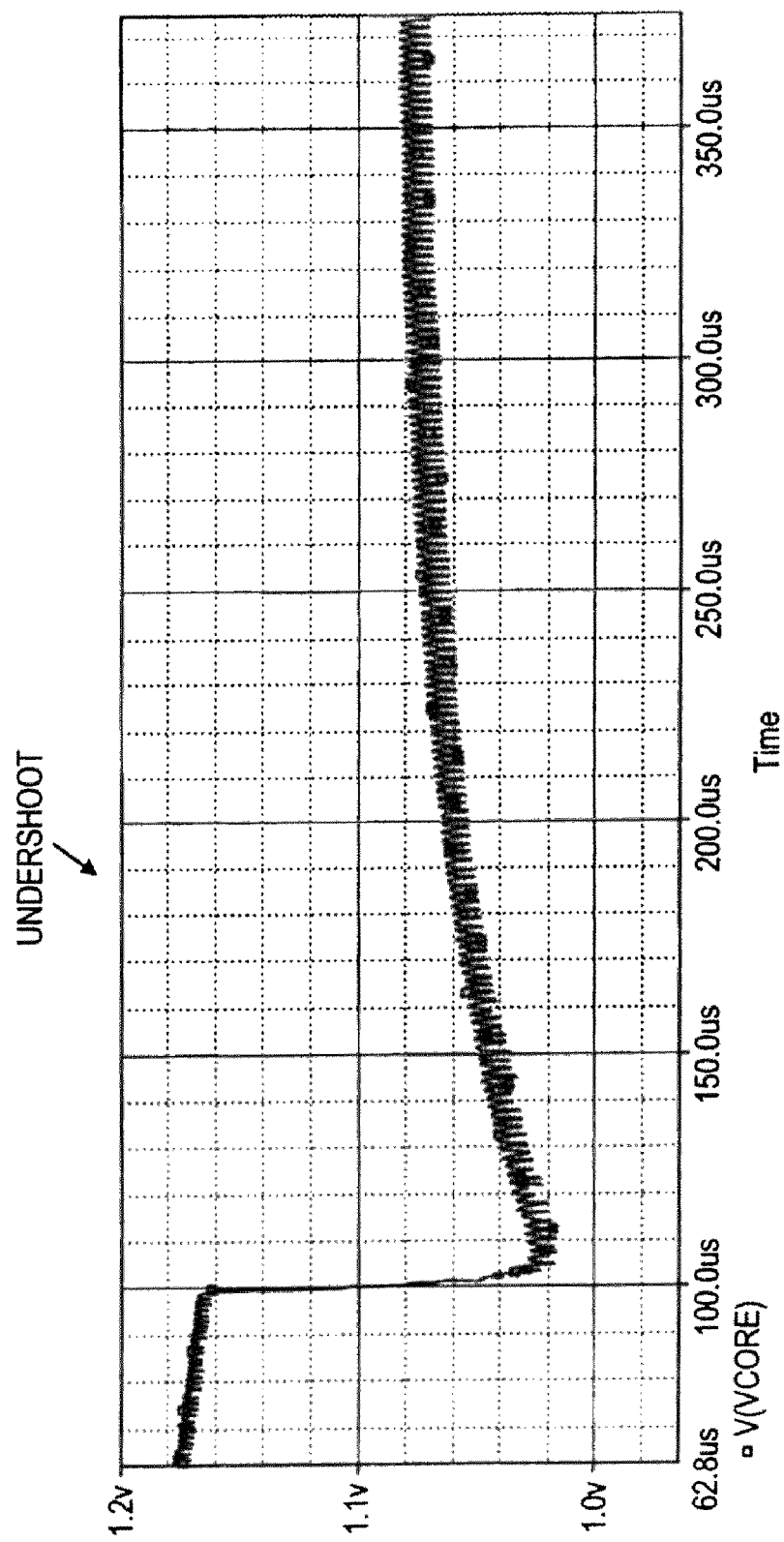
FIG. 3 illustrates a waveform when the voltage regulator is undershoot.
Figure 4:
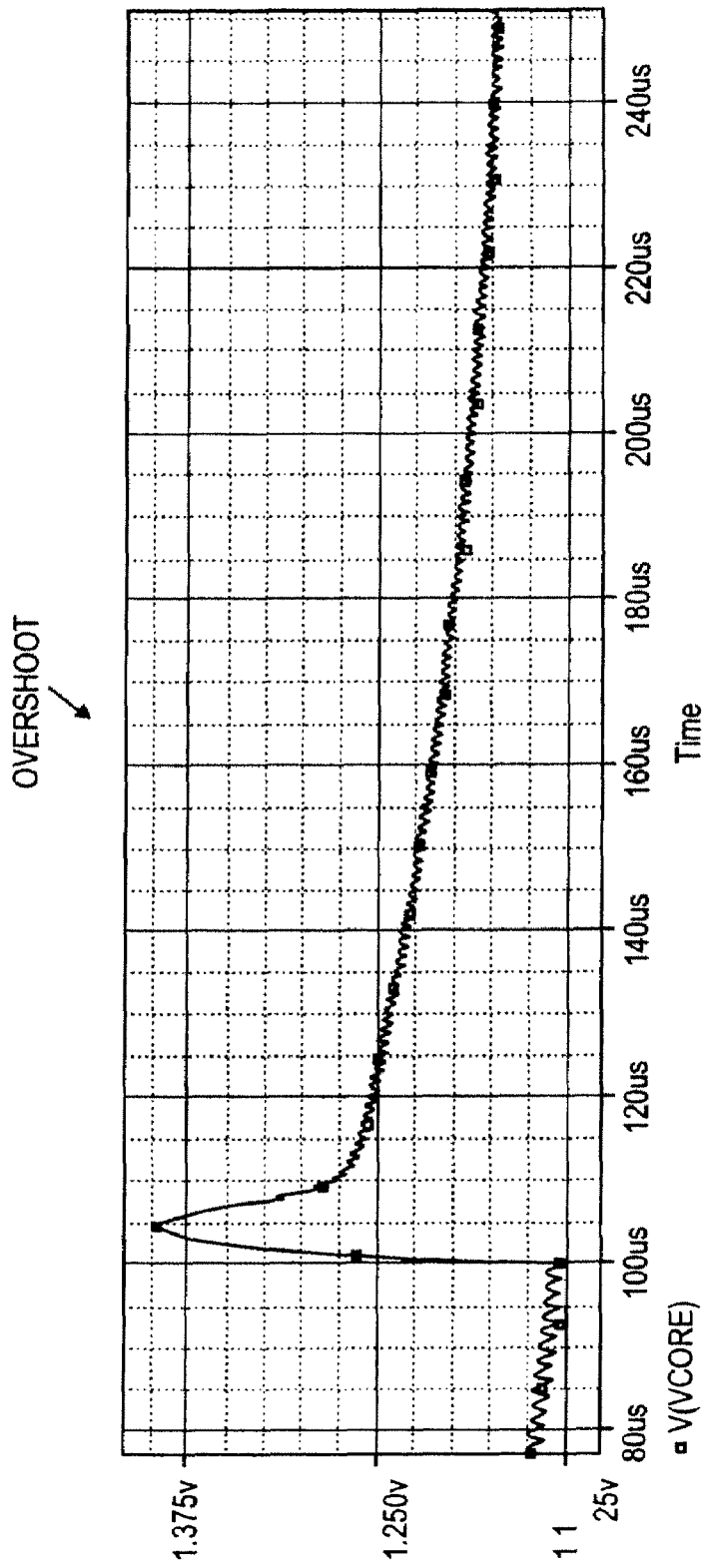
FIG. 4 illustrates a waveform when the voltage regulator is overshoot.

Inductor L 225 and resistor DCR 230 have a particular behavior when current is flowing through them. Since the current is not constant, its waveshape is triangular. If the current is not compensated appropriately, it may have undershoot or overshoot problems as shown in FIGS. 3 and 4, respectively.

In FIG. 2 the two power circuits 205, 210 are in parallel. If both phase 1 and phase 2 of the power circuit 205, 210 operate in the wake mode, each of the inductor L 225 conducts half the amount of the total current output to the processor. Equivalently then, the inductor L 225 is actually half the value of L because the two inductors 225 are in parallel. As such, the resistor DCR 230 value is also half of DCR because they are in parallel.

The output information 235 from the power circuits 205, 210 is sent to $C_N$ and $R_N$, which then sends the information to a VR controller 240. Since L and DCR are coupled to $C_N$ and $R_N$, the value of $C_N$ and $R_N$ is also half the value when operating in two phases. When the CPU goes into sleep state and both phases are simultaneously operated, then a significant amount of power is being dissipated by the voltage regulator itself. To reduce the amount of power being dissipated by the voltage regulator, the system may operate in a single phase configuration by shutting down phase two, for instance.

The CPU may send a signal to the power circuits 205, 210 to indicate if the CPU is operating in wake or sleep mode. This information is then sent 245 to the VR controller 240 which controls whether the system is operating in one phase or two phase. When the CPU is in the wake state the switch 250 is closed and both phases are operating. However, if the CPU sends a signal 245 indicating it is in sleep mode, then the switch is open and phase two is completely shut down. It should be noted that either phase may be turned off. Also the switch may be controlled by either hardware or software.

Previously, when operating in two phases, $C_N$ and $R_N$ were compensated for half the value of L and DCR. Now, when operating in a single phase, $C_N$ and $R_N$ have to compensate for a value of one L and one DCR. Furthermore, since the CPU is in the sleep state the system may want to run the VR frequency at a lower frequency.

To compensate for this, $R_{NP}$ 255 is used. $R_{NP}$ 255 may have the same value as $R_N$. During two-phase operation, the switch SW 250 is on, connecting R.sub.N in parallel to $R_{NP}$. The RC time constant [$C_N$ and parallel ($R_N//R_{NP}$)] is designed to match and optimize with the time constant of ½ (½ $C_L$ and ½ $R_L$). During single-phase operation, the switch SW 250 is off or open. As such, the RC time constant is increased to (CN and RN) to match with the time constant ($C_L$ and $R_L$).

Figure 5:
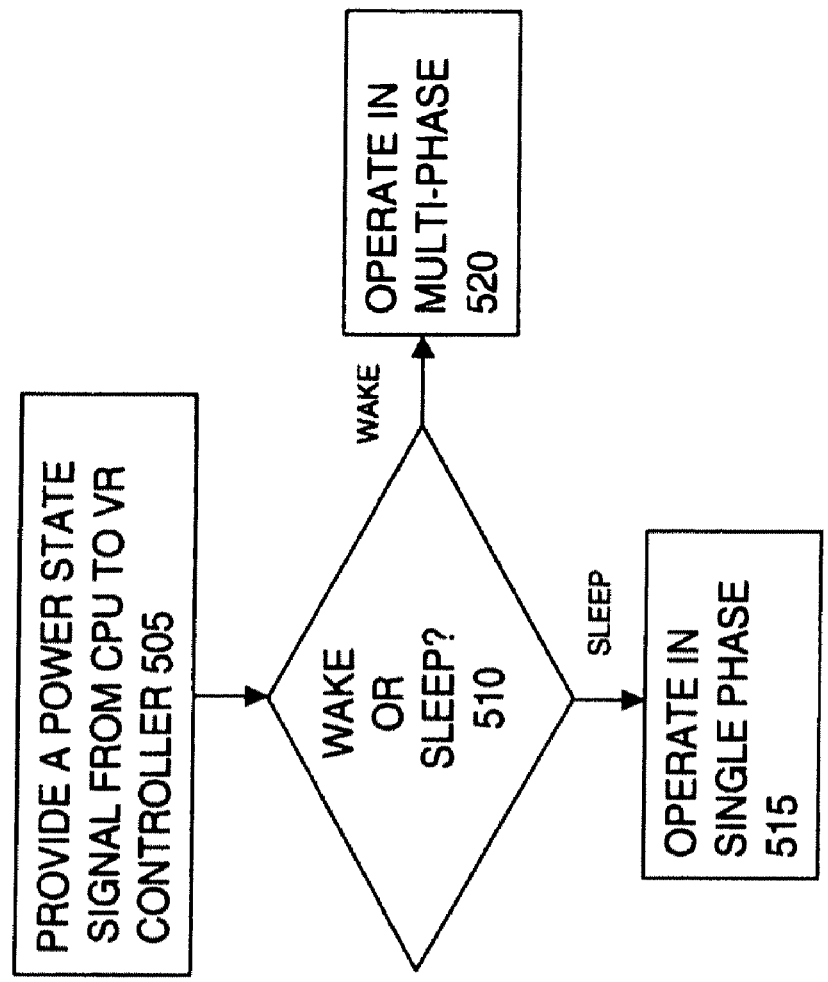
FIG. 5 illustrates a flow chart of the one embodiment.

FIG. 5 illustrates a flow chart 500 of the one embodiment. At block 505, a power state signal is provided to a voltage regulator controller 240 to indicate the power state of the CPU or any other component. Next, at block 510, the power state signal indicates if the CPU is in wake state or sleep state. If the CPU is in wake state, the process proceeds to block 520, and the voltage regulator is operated in two phase and the switch is closed. If, however, the CPU is in sleep state, the process proceeds to block 515, and the voltage regulator is operated in single phase and the switch is opened.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An electronic device, comprising:
   an input to receive a power state signal to indicate a power state of one or more components in a computer system;
   outputs to drive first phase and second phase power switches;
   circuitry to drive both the first phase and second phase power switches when the power state signal is at a first state and to de-activate one of the first and second phase power switches during a time when the power state signal is at a second state; and
   current sense circuitry for monitoring an output voltage, said current sense circuitry to receive summed together inductor current signals from first and second output phase sections coupled to said first and second power phase switches.

2. The device of claim 1, in which the power switch to be de-activated is de-activated by de-activating its associated driver.

3. The device of claim 1, wherein the circuitry in response to satisfied conditions is to drive the active one of the first and second power switches at a lower frequency when the power state signal is at the second state.

4. The device of claim 1, wherein the first and second phase power switches are in parallel.

5. The device of claim 4, wherein each power switch is to be coupled to an inductor and resistor in series, and wherein the resistor is the dc resistance of the inductor.

6. The device of claim 1, comprising adjustment circuitry to adjust for different current feedback parameters in the first and second states.

7. The device of claim 6, in which the adjustment circuitry comprises one or more switches to engage and disengage one or more passive elements to be used for feedback current.

8. A two-phase buck controller, comprising:
   an input to receive a power state signal to indicate one of first and second states; and
   circuitry to operate the controller in a two-phase operation mode when the input is at one of the first and second states and to operate the controller in a single-phase operation mode when the input is at the other of the first and second states, wherein the controller can operate at a reduced switching frequency when in the single phase operation mode.

9. The controller of claim 8, further comprising current sense circuitry for monitoring an output voltage, said current sense circuitry to receive summed together inductor current signals from first and second output phase sections.

10. The controller of claim 8, wherein the controller is to operate at the reduced switching frequency in response to satisfied conditions.

11. The controller of claim 8, wherein the controller is to drive first and second power switches.

12. The controller of claim 11, in which the first and second power switches are in parallel.

13. The controller of claim 12, wherein each power switch is to be coupled to an inductor and resistor in series, and wherein the resistor is the dc resistance of the inductor.

14. The controller of claim 8, comprising adjustment circuitry to adjust for different current feedback parameters in the first and second states.

15. The controller of claim 14, in which the adjustment circuitry comprises one or more switches to engage and disengage one or more passive elements to be used for feedback current.

16. The controller of claim 8, further comprising current sense circuitry for monitoring an output voltage, said current sense circuitry to receive summed together inductor current signals from first and second output phase sections coupled to said first and second power phase switches.

17. The controller of claim 8, wherein the controller is to operate in the single phase mode in response to the other state during steady state operation.

* * * * *